United States Patent [19]

Wedemeyer et al.

[11] Patent Number: 4,534,861
[45] Date of Patent: Aug. 13, 1985

[54] VACUUM PUMP PURGING APPARATUS

[75] Inventors: Robert C. Wedemeyer, San Francisco; Robert H. Giebeler, Jr., Cupertino, both of Calif.

[73] Assignee: Beckman Instruments, Inc., Fullerton, Calif.

[21] Appl. No.: 605,340

[22] Filed: Apr. 30, 1984

[51] Int. Cl.³ .............................................. B01D 45/06
[52] U.S. Cl. ..................... 210/168; 55/185; 417/312
[58] Field of Search ............... 210/168; 55/185, 187; 417/312

[56] References Cited

U.S. PATENT DOCUMENTS

| | | | |
|---|---|---|---|
| 2,205,336 | 6/1940 | Beach | 55/187 |
| 2,674,406 | 4/1954 | Heckendorf | 417/312 |
| 3,312,044 | 4/1967 | McCarter | 55/185 |
| 3,389,853 | 6/1968 | Dirk | 417/312 |
| 3,483,984 | 12/1969 | Wolkenhauer | 210/168 |
| 3,955,945 | 5/1976 | Bauer | 55/185 |
| 4,255,170 | 3/1981 | Wahl | 55/185 |

Primary Examiner—Tim Miles
Attorney, Agent, or Firm—W. H. May; P. R. Harder

[57] ABSTRACT

An apparatus for removing liquid contaminants from the oil sump of a vacuum pump. A liquid separator mounted on the housing of the pump connects the interior of the pump housing to the atmosphere through a liquid trap. An inlet passage through the separator connects a source of purging air to the interior of the pump housing, causing the air therein to flow through the liquid trap to the atmosphere. Because outflowing purged air is cooled by inflowing purging air, oil is selectively retained within the pump housing.

19 Claims, 2 Drawing Figures

VACUUM PUMP PURGING APPARATUS

BACKGROUND OF THE INVENTION

The present invention relates to centrifuge vacuum pumps and is directed more particularly to a purging apparatus for removing contaminating liquids such as water from the lubricating oil of vacuum pumps.

Because large quantities of heat can be generated by the friction between a spinning rotor and the air in the rotor space of a high speed centrifuge, it is frequently necessary to maintain a near vacuum within the rotor space. This vacuum may be produced by any of a number of different kinds of vacuum pumps. Many of these pumps have pump housings within which a predetermined depth of lubricating oil must be present in order to assure the maintenance of a good seal between the parts of the pump. In most pumps of this type, the air that is removed by the pump is discharged through an outlet that connects the interior of the pump housing to the open air through a porous filter.

In addition to including vacuum systems, many centrifuges include refrigeration systems to maintain the rotor space at below ambient temperatures. As a result, as the centrifuge is opened and closed during sample insertion and removal, moisture tends to condense on the walls of the rotor space. Later, when the vacuum pump evacuates the rotor space, this condensed moisture will vaporize and the removed by the pump. Over time, this removed moisture tends to accumulate in the lubricating oil of the pump. In large enough quantities, this moisture can not only change the lubricating properties of the oil, but can also result in the formation of emulsions and in a reduction in the base pressure produced by the pump.

SUMMARY OF THE INVENTION

In accordance with the present invention it has been discovered that one of the reasons why liquids accumulated within the oil of a vacuum pump is that, after the initial pump down, there is little opportunity for liquids in the lubricating oil to escape into the atmosphere. This is because, after the initial pump down, there is no substantial continuing flow of air through the outlet of the pump. In order to deal with this lack of flow, the present invention contemplates a purging apparatus which establishes a continuous flow of cool purging air into the pump housing, which flow is then directed outwardly to the atmosphere. As a result of this flow, vaporized liquids are continuously removed from the air space above the oil sump. As this occurs, the oil within the sump is progressively stripped of absorbed liquids and restored to its intended condition.

As the purged air flows out of the pump housing, it is directed through a liquid separator which is maintained at or near ambient temperatures. As a result, the liquids that are suspended in the purged air tend to condense out before they leave the separator. Because of this condensation, the air that is vented to the atmosphere tends to be relatively free of oil and other liquids. Thus, the desired purging of the pump housing is accomplished without injecting large quantities of oil into the ambient air.

In the preferred embodiment, the abovedescribed effect is enhanced by including in the separator a counterflow arrangement which forces the warm outflowing purged air to flow over the outer surface of the conduit which conducts cool inflowing purging air. This counterflow arrangement enhances the degree to which oil droplets that are suspended in the purged air coalesce into droplets that flow back to the oil sump. As a result, the separator tends to reduce the loss of oil from the pump.

In addition, the separator is constructed so that cool purging air flows into the pump housing from a location that is nearer to the surface of the oil than the location from which warm purged air flows out of the pump housing. The latter construction helps to direct the inflowing purging air downwardly and outwardly from the separator and the outflowing purged air upwardly and inwardly toward the separator. As a result, the air within the pump exhibits a stable circulation pattern which has mutually reinforcing convention and forced components.

Finally, the present invention contemplates a liquid separator which has a size and shape that causes it to act as a tuned Helmholtz resonator. Because of this resonant action, the separator is able to muffle the noise that is produced by the pump, particularly during the initial pump down of the rotor space. Thus, the purging system of the invention improves the acoustic quality of its environment as well as its chemical quality.

DESCRIPTION OF THE DRAWINGS

Other objects and advantages of the invention will be apparent from the following description and drawings, in which.

DESCRIPTION OF THE PREFERRED EMBODIMENT

Figure 1:
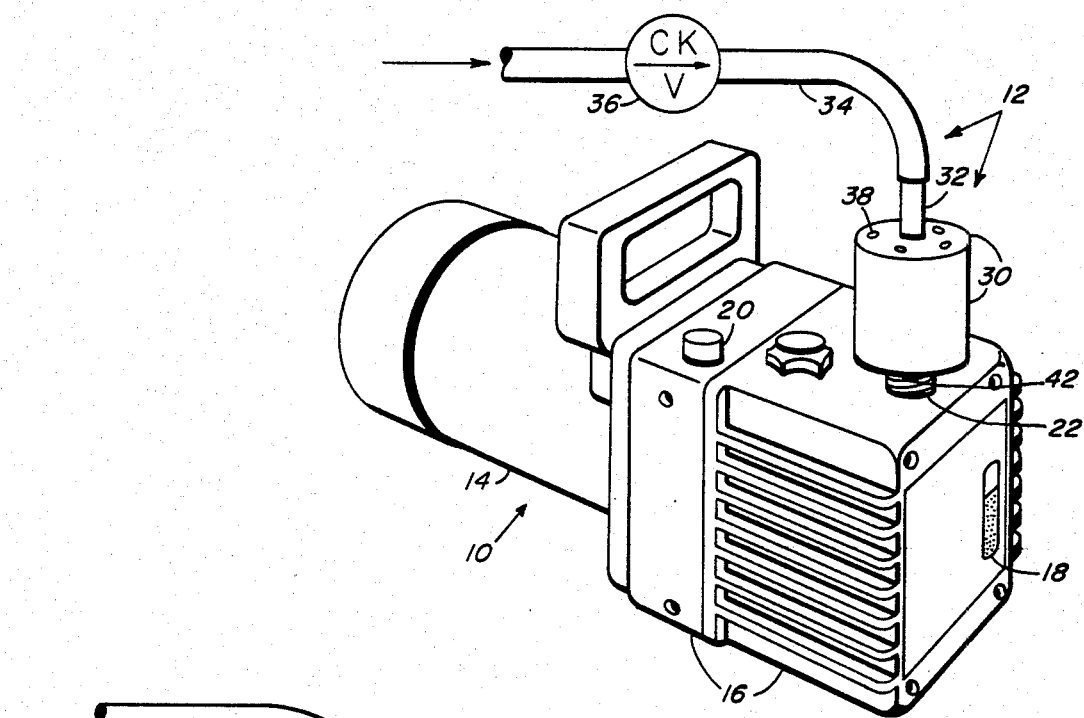
FIG. 1 is an external perspective view of a vacuum pump that includes the purging apparatus of the present invention.

Referring to FIG. 1, there is shown a perspective view of a vacuum pump 10 which is equipped with a purging apparatus 12 that is constructed in accordance with the present invention. Vacuum pump 10 is of a conventional design and includes a drive motor 14 for driving the pump elements (not shown) that are located within a pump housing 16. In addition to housing the pump elements, housing 16 contains an oil sump for assuring a continuous supply of lubricating oil to the pump elements, the level of the oil in the sump being visible through an oil sight glass 18. During operation, pump 10 pumps air from the rotor space of a centrifuge (not shown) through an inlet line (not shown) which is connected to an inlet 20, and exhausts that air through an outlet hole and purging apparatus 12.

Figure 2:
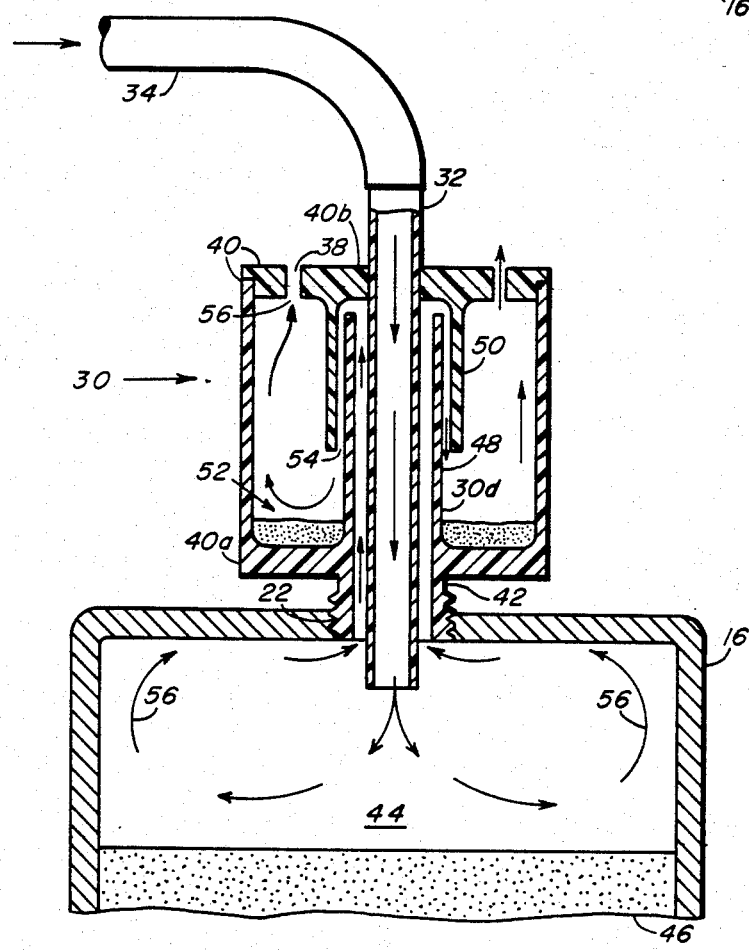
FIG. 2 is a partial cross-sectional view of the embodiment of FIG. 1.

In the embodiment of FIG. 1 purging apparatus 12 includes a liquid separator 30 which is mounted in the pump outlet hole by means of suitable threads 22 shown in FIG. 2. As will be explained more fully presently, separator 30 provides a first gas flow path including a liquid trap through which the air space above the oil sump of the pump is connected to the ambient air. In addition, separator 30 provides a second gas flow path through which the air space above the oil sump is connected to a source of purging air via a flexible hose 34 and a check valve 36. This source may, for example, be the high pressure side of an air flow duct, such as that through which a fan blows cooling air over the heat sinks of the centrifuge, which has been tapped to receive hose 34. With a source of this type a satisfactory purging air pressure, such as that corresponding to 7.6 mm of water, may be readily achieved.

As the above source directs cool purging air into housing 16, it displaces hot purged air therefrom and forces the same to flow out of one of the outlet holes 38 that are located at the top of separator 30. As this occurs, the liquids that are entrained in the purged air tend to condense and collect in the liquid trap of separator 30. At the same time, separator 30 acts as an acoustic resonator which muffles the sound that is produced by a pump 10, particularly when the latter first begins to pump air out of the rotor space. Thus, purging apparatus 12 serves both the remove liquid contaminants from the oil sump of pump 10 and to muffle the sound produced thereby.

The paraticulars of the structure and operation of purging apparatus 12 will now be described with reference to the partial cross-sectional view thereof which is shown in FIG. 2. As shown in FIG. 2, separator 30 has a generally cylindrical housing 40 which includes a cup-shaped lower housing section 40a and a generally circular upper housing section 40b that are held by together the tightness of the fit therebetween. Housing 40 is mounted on pump housing 16 by a neck 42 which is provided with threads 22 that are adapted to engage the mating threads of the pump outlet hole. The latter outlet hole is preferably located above the approximate center of the air space 44 above oil sump 46 in order to permit a smooth air circulation pattern to develop within the pump housing.

In the preferred embodiment, separator 30 preferably includes a plurality of concentric internal flow passages through which air is directed both into and out of pump housing 16. As shown in FIG. 2, these flow passages include a purging air inlet passage defined by the inner surface of a conduit 32; a purged air inlet passage defined by neck 42, the outer surface of conduit 32, and annular projections 48 and 50 of lower and upper housing sections 40a and 40b, respectively; and a purged air outlet passage comprising holes 38. Separator 30 of FIG. 2 also includes a liquid trap 52 which disposed in liquid collecting relationship between the outlet end 54 of the purged air inlet and the inlet end 56 of the purged air outlet. This liquid trap preferably has a volume sufficient to hold the liquid that is expected to collect between successive inspections of the centrifuge. In order to facilitate such inspections, housing 40 is preferably composed of a transparent plastic which allows the level of the liquid therein may be determined without disassembling it. If this visual inspection reveals that too much liquid has collected, separator 30 should be disassembled and emptied before the pump is placed back in operation.

The operation of separator 30 will now be described. Each time pump 10 begins to evacuate a centrifuge, the rate of air flow into pump inlet 20 will initially be very high. This high rate of flow is prevented from producing a backflow of air in hose 34 by check valve 36. As a result, the air that is pumped from the centrifuge will flow through the purged air inlet of separator 30 and liquid trap 52 before being exhausted to the atmosphere through holes 38. As the pressure within the centrifuge approaches a vacuum, this flow of air drops to approximately zero, allowing the pressure within pump housing 16 and separator 30 to become approximately equal to atmospheric pressure. When this occurs, the pressure produced by the purging source will cause check valve 36 to open, thereby initiating a flow of cool purging air into the air space 44 above oil sump 46.

When purging air enters air space 44, it is directed downwardly and outwardly over the surface of he oil, where it becomes heated and absorbs or entrain oil droplets along with the droplets of liquid contaminants such as water that are present in the oil. As this occurs, the heated air rises along the outer walls of the housing, flowing inwardly and upwardly towards the purged air inlet of separator 30. The circulation pattern that is established by this flow is indicated by arrows 56 of FIG. 2. From this pattern, it will be seen that the overall flow has both a forced component and a convective component and is relatively symmetrical and free of turbulence. This desirable circulation pattern is particularly strong in embodiments of the invention, such as that shown in FIG. 2, in which the end of purging air inlet of the separator projects further into the pump housing than the purged air inlet thereof.

As the purged air flows upwardly through separator 30, it is cooled by its contact with the outer surface of conduit 32. This cooling tends to cause entrained oil droplets to condense or coalesce on conduit 32 and run back into the oil sump. Droplets of other entrained liquids, however, tend not to condense, but rather to continue to flow through the separator until they flow past the U-shaped bend in the purged air inlet passage, i.e., the bend introduced by housing projection 50. Thereafter, as the air enters liquid trap 52, its velocity is greatly decreased at the same time that it comes into contact with the cool outer wall of separator 30. As a result, all of the entrained liquid droplets, and particularly the oil droplets, tend to condense and accumulate within liquid trap 52, allowing relatively oil-free air to flow out of separator 30 through holes 38. This tendency of the entrained liquids to accumulate within the liquid trap may be enhanced by minimizing the rate at which heat can flow from the housing of the pump to the housing of the separator. This may be accomplished by, for example, providing a layer of thermal insulation either within the wall of pump housing 16 or between the housing and separator 30.

Because of the continuous circulation of the oil within pump housing 16, all parts of the oil therein are repeatedly circulated past the above-described flow of purging air. As this circulation continues, the purging air gradually strips the lubricating oil of the easily vaporized liquid constituents thereof. As a result, the lubricating oil does not tend to undergo the changes in its properties that are caused by the accumulation of contaminants and by the formation of oilwater emulsions. In addition, the reduced water content of the oil results in an increase in the base pressure produced by the pump. It will therefore be seen that the purging apparatus of the invention improves the operation of the pump.

In the preferred embodiment, the size, shape and proportions of the various parts of separator 30 are selected so that the separator as a whole tends to muffle the noise produced by pump 10, particularly when the latter is started up. This is preferably accomplished by designing separator 30 to act as a tuned Helmholtz resonator having a resonant frequency that corresponds to the frequency at which pump 10 generates the most acoustic energy. The latter condition assures that the interior of separator 30 becomes occupied by waves which destructively interfere with one another and which dissipate their energy as the heat produced by friction between the air molecules within the separator.

Because the separator has a complex geometry, its resonant frequency is affected by both the absolute and relative sizes of many of its internal parts. The resonant frequency of the separator is, for example, inversely proportional to its interior volume and to the length of the purged air inlet passage. The resonant frequency of the separator is also directly proportional to the width of the purged air inlet passage and to the length and diameter of outlet holes 38. Because of the number of these variables, and the relationships therebetween, it will be apparent there are a number of different separator configurations which will have the same resonant frequency.

The simplest way to design separator 30 to exhibit a particular resonant frequency is to select which of its dimensions or features will be held constant and which will be used as frequency control variables. One can, for example, choose to hold the length, size and number of outlet holes, the diameter of the separator and the width of the purged air inlet passage constant while varying the length of the separator as necessary to produce the desired frequency. With this approach, the dimensions necessary to achieve the desired frequency can be determined quickly by experiment, rather than by lengthy and difficult calculations.

While the muffling produced by separator 30 is adversely affected by the accumulation of liquids within trap 52, an adequate degree of muffling may be maintained by emptying the separator from time to time. The interval between these emptyings need not be short, however, because the continued circulation of purging air through the separator promotes the evaporation of the easily vaporized constituents of the liquid within trap 52. As a result, only oil tends to remain within the separator after long periods of operation. In addition because of the low rate of flow of the purging air, even oil tends to accumulate within trap 52 only relatively slowly. Thus, the muffling effect of the separator is not seriously affected by its own operation.

In view of the foregoing, it will be seen that a purging apparatus constructed in accordance with the present invention has a number of important advantages. Firstly, it tends to actively remove easily vaporizable liquids from the lubricating oil of the pump by continually exposing that oil to a circulating current o cool dry air. Secondly, it tends to condense entrained oil droplets on the cool walls of the purging air inlet and thereby return it to the oil sump. Finally, it serves to muffle the sounds produced by the operation of the pump, particularly at the start-up thereof. Together, these advantages represent a significant inprovement in vacuum pump technology.

What is claimed is:

1. An apparatus for purging contaminating liquids from a vacuum pump of the type having a housing that encloses an oil sump, comprising:
   (a) a separator for collecting said liquids from the pump housing including:
      (i) a purging air inlet,
      (ii) a purged air inlet,
      (iii) a purged air outlet, and
      (iv) a liquid trap connected between the purged air inlet and the purged air outlet,
   (b) first means for connecting the purging air inlet and purged air inlet in fluid communication with the pump housing, and
   (c) second means for connecting the purging air inlet to a source of purging air.

2. The apparatus of claim 1 in which the purging air inlet is surrounded by the purged air inlet.

3. The apparatus of claim 2 in which the purging air inlet extends further into the pump housing than the purged air inlet.

4. The apparatus of claim 1 including a layer of thermal insulation between the separator and the interior of the pump housing.

5. The apparatus of claim 1 in which the purged air outlet comprises a plurality of holes through the upper end of the separator.

6. The apparatus of claim 1 including a check valve connected in series with the purging air inlet.

7. The apparatus of claim 1 in which the first connecting means also serves as means for mounting the separator on the pump housing.

8. The apparatus of claim 1 in which the separator includes a lower housing section having an upwardly extending annular projection, and an upper housing section having a downward extending annular projection, said projections and the purging air inlet together defining the purged air inlet.

9. The apparatus of claim 1 in which the size and shape of the separator are selected so that the separator muffles the sound produced by the pump.

10. The apparatus of claim 9 in which the separator functions as a tuned Helmholtz resonator.

11. An apparatus for purging contaminating liquids from a vacuum pump of the type having a housing that encloses an oil sump, comprising:
   (a) a separator for collecting said liquids from the pump housing, including:
      (i) a separator housing defining a liquid trap,
      (ii) a first conduit for conducting a flow of purging air into the pump housing,
      (iii) a second conduit for connecting the pump housing to the liquid trap, and
      (iv) a third conduit for connecting said liquid trap to the atmosphere;
   (b) means for mounting the separator on the pump housing; and
   (c) means for connecting the first conduit to a source of purging air.

12. The apparatus of claim 11 in which the first conduit is surrounded by the second conduit.

13. The apparatus of claim 12 in which the first conduit extends further into the pump housing than the second conduit.

14. The apparatus of claim 11 including a layer of thermal insulation between the separator housing and the pump housing.

15. The apparatus of claim 11 in which the first and second conduits are concentric with one another and pass through said mounting means.

16. The apparatus of claim 11 including a check valve in fluidic series with the first conduit.

17. The apparatus of claim 11 in which the separator includes a lower housing section having an upwardly exending annular projection, and an upper housing section having a downward extending annular projection, said projections and the first conduit together defining the second conduit.

18. The apparatus of claim 11 in which the size and shape of the separator are selected so that the separator muffles the sound produced by the pump.

19. The apparatus of claim 18 in which the separator functions as a tuned Helmholtz resonator.

* * * * *